(12) United States Patent
Couse

(10) Patent No.: US 8,509,220 B2
(45) Date of Patent: Aug. 13, 2013

(54) SYSTEM AND METHOD FOR DISPLAYING A CALLED PARTY CALENDAR ON A VOICE OVER IP PHONE DISPLAY

(75) Inventor: Peter Francis Couse, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 821 days.

(21) Appl. No.: 12/383,719

(22) Filed: Mar. 26, 2009

(65) Prior Publication Data

US 2010/0246565 A1    Sep. 30, 2010

(51) Int. Cl.
*H04L 12/66* (2006.01)
*H04M 3/42* (2006.01)

(52) U.S. Cl.
USPC ............... 370/352; 379/201.01; 379/201.1

(58) Field of Classification Search
USPC ............... 379/221, 202.01, 201.01, 201.1, 379/201.07; 370/352
See application file for complete search history.

(56) References Cited

U.S. PATENT DOCUMENTS

| 5,872,841 | A | 2/1999 | King et al. |
| 7,251,320 | B1 | 7/2007 | Todd |
| 7,362,854 | B2 | 4/2008 | Mcknight |
| 7,991,136 | B2 * | 8/2011 | Denny et al. ............. 379/202.01 |

| 2007/0033251 | A1 | 2/2007 | Mandalia et al. |
| 2007/0115919 | A1 | 5/2007 | Chahal et al. |
| 2007/0115923 | A1 * | 5/2007 | Denny et al. .................. 370/352 |

FOREIGN PATENT DOCUMENTS

WO   WO 2008/064483 A   6/2008

OTHER PUBLICATIONS

Gogle Inc.: "About Google Calendar—What's new with Google Calendar" (online) Jun. 16, 2008; XP002551723 Archive Wayback Machine—Internet: http://web.archive.org/web/20080616081.
Dusseault L et al: "Open Calendar Sharing and Scheduling with CalDAV" IEEE Internet Computing, IEEE Service Center NY, NY Mar. 1, 2005 pp. 81-89 vol. 9, No. 2.
Blank, Brian,CommuniGate Brings enhanced Call control and Calendar Features to Pronto! Portable Flash Client; PRLOG.Org—Global Press Release Distribution; Sep. 11, 2007.

* cited by examiner

*Primary Examiner* — Thjuan K Addy

(57) ABSTRACT

A system and method for displaying a contact's availability information on a display of a voice over internet protocol (IP) phone includes sending a request for a selected telephone contact's availability information. The request is from the IP phone to a web service calendar module operable on a web server connected to the IP phone. The telephone contact's availability information is extracted from an application server connected to the web server. The availability information is formatted for display in a graphical user interface on the IP phone. The availability information for the telephone contact is then displayed on the IP phone to enable a user to determine when the selected telephone contact is available to receive a telephone call.

17 Claims, 3 Drawing Sheets

SYSTEM AND METHOD FOR DISPLAYING A CALLED PARTY CALENDAR ON A VOICE OVER IP PHONE DISPLAY

FIELD OF INVENTION

The present invention relates generally to determining when a business associate is available to receive a phone call. More particularly, the present invention relates to the use of a calendar system on a voice over internet protocol (VOIP) phone to determine when a business associate is available to receive a phone call.

BACKGROUND

A revolution in communications has occurred in the $21^{st}$ Century. People can communicate in a large number of ways that were unimaginable only a couple of decades ago. It is now commonplace to communicate using e-mail, text messaging, blogging, and through social websites. However, despite the influx of new communication methods, the use of a telephone has actually increased. A variety of computing devices, such as cameras, video recorders, pagers, organizers, video game systems, and so forth have all been integrated with the telephone. The vast majority of people now own their own personal telephone with a unique telephone number, enabling them to communicate more frequently. The large increase in the number of telephones that has occurred in recent years, in spite of all of the new forms of interpersonal communication, shows the importance that is placed on oral communications over the written word.

Nevertheless, the revolution in communications has not made it significantly easier to contact other persons using the telephone. This is especially true at work, where people's work hours are often divided between meetings, trips, and work outside of one's office or primary working location. It is still commonplace for business associates to play "telephone tag", wherein phone calls are repeatedly missed, and voice mails left in their place, often with increasing frustration. The inability to efficiently contact business associates using a telephone often results in significant inefficiencies in decision making, business deals, and other work related activities.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
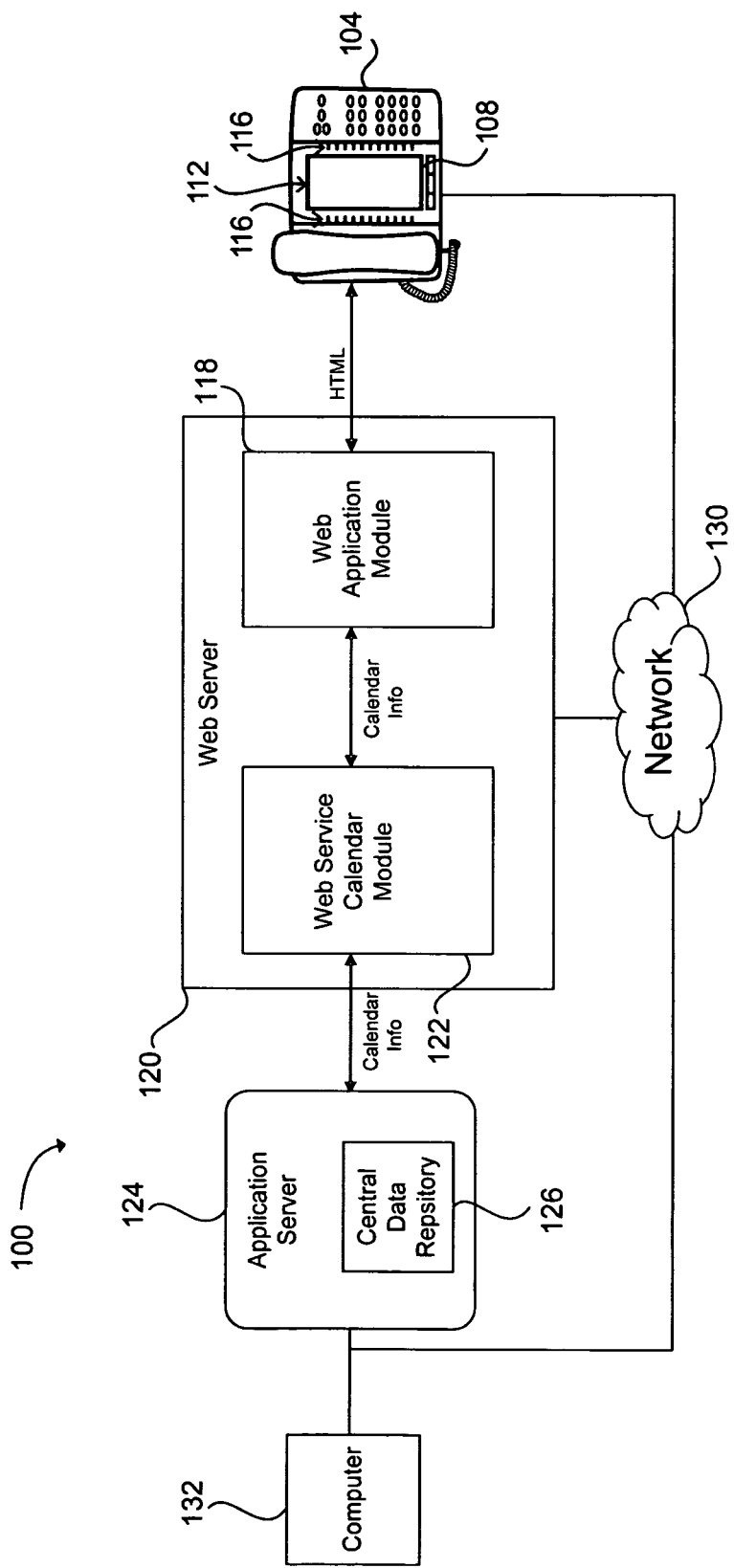
FIG. 1 is an illustration of a block diagram of a system for displaying a telephone contact's availability on an IP phone in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

THE INVENTION

In order to increase the ability to efficiently contact business associates using a telephone, a system and method is needed to determine when a particular telephone contact is available. In accordance with one embodiment of the present invention, a user of a voice over internet protocol (VoIP) phone can look up a contact with their phone based directory or select a contact from a pre-programmed list of "favorite" contacts. The user can then view the telephone contact's calendar information on a display on the IP phone that shows a graphical user interface. The contact's calendar information can be displayed for a predetermined period in the future, such as for the next 24 hours, the next 3 days, the next week, or another selected period.

In one embodiment, the information displayed on the IP phone display can be extracted from the telephone contact's personal computer or server based calendar application. The calendar display can show the contact's available time and busy time for the selected period. If the contact's calendar indicates that the telephone contact is currently busy, the user can be presented with the option of a calendar callback for a selected time slot based on the calendar display. For example, a first available time slot for the contact may be selected. When the user selects this option, the user's phone can beep quietly and display a message at the specified callback time. The graphical user interface on the user's IP phone can be used to place the telephone call to the contact by selecting a specified button or soft-key on the display. The visual message and audible tone can be used to inform the user that the contact is now available according to the contact's calendar information, thereby enabling the user to place the phone call with a greater degree of certainty that the contact will be available to receive the phone call.

Alternatively, the user can have the option to place a "phone call request" at the first mutually available time slot of the user and the telephone contact, or another time slot selected by the user. Selecting a phone call request results in an invitation message that can be displayed on the contact's phone indicating that the user would like to have a phone call with them at the first mutually available time slot. If the contact indicates that he or she agrees to the phone call, the contact's phone can be configured to automatically call the user, or may alert the contact and the user to place the phone call. In both the callback and the phone call request cases, the message displayed on the phone can be removed after a selected period, such as 15 minutes, if no action is taken by the user or the contact.

In accordance with one embodiment of the present invention, a system for displaying a telephone contact's availability is disclosed. FIG. 1 provides one exemplary block diagram of a system 100 for displaying a telephone contact's availability on an IP phone. The system 100 can include a voice over internet protocol (IP) phone 104 having a display screen 108. The display screen is operable to display a graphical user interface (GUI) 112. The display screen can be a touch screen, enabling a user to interact with the GUI by touching selected areas on the screen. The selected areas are typically referred to as soft keys. Alternatively, a standard display screen can be used with a plurality of buttons 116 located adjacent the display screen. The user can interact with the GUI using the adjacent buttons.

The system 100 can further include a web server 120 in communication with the IP phone 104 and with an application server 124 through a network connection 130. The network connection can be a local area network, a wide area network, a network connection via the internet, or another type of network connection that enables the servers 120, 124 and the IP phone 104 to communicate. The application server can host a central data repository 126 for a contact and calendar application. A web service calendar module 122 operable on the web server 120 is configured to extract contact and calendar information from the central data repository for the selected telephone contact.

The ability for the user and the selected contact to schedule a telephone conference using calendaring information displayed on the user's IP phone display is made possible through the software modules operating on the web server 120, as shown in the block diagram of FIG. 1. In one embodiment, the software modules can be web server applications operated on a server such as an Apache web server, the Microsoft IIS server, the Google Web server, or another type of compatible web server.

The system 100 also includes a web application module 118 that is operable on the web server 120. The web application module is configured to format the contact and calendar information extracted by the web service calendar module 122 for display in the GUI 112 which can be viewed on the IP phone's 104 display screen 108. The display screen can then display the contact and calendar information of the telephone contact on the display screen to enable a user to determine the telephone contact's availability based on the contact's calendar information.

The web service calendar module 122 can utilize an API provided by the application server 124. Access to the data stored in the application server can be from across an intranet or through the internet. This enables a phone system utilizing the web application module 118 or web service calendar module 122 to be deployed over a wide area. For example, an international company may have business locations on several continents. The company can employ an integrated IP phone system, with the phone system at each of their locations connected to the web server 120 and application server 124 through the network connection 130 to enable the telephone contact that is located within the company to have his or her information displayed on the IP phone display. Security can be maintained through the use of individual user credentials provided by the user to gain access to the data stored within the application server.

In one embodiment, the application server 124 can be a messaging server, such as a Microsoft Exchange server, a Linux mail server, an Apple mail server, or another type of server capable of receiving and distributing email. The messaging server can be connected to selected computers 132 that are part of the network 130. The central data repository 126 can store calendar and contact information for each user having a computer 132 on the network. Each user can input his or her schedule using a calendaring application operating on the user's computer that is configured to interface with the messaging server application operating on the application server 124. Alternatively, calendaring and contact information may be split between a messaging server such as the Microsoft Exchange server and a Lightweight Directory Access Protocol (LDAP) server such as Microsoft Active Directory. In installations where both servers are deployed, the web server 120 can communicate with both servers to obtain the necessary contact and schedule information.

The IP phone 104 can be configured with an applications programming interface (API), such as a hyper text meta language (HTML) based API. The API can be provided by the IP phone manufacturer. The HTML based API allows an external HTML based application to use the phone's graphical display. The API can also be configured to accept on other types of programming languages such as extensible markup language (XML), Java, Perl, or Ajax based API that can be used to provide the same functionality. The web application module 118 can be configured to accept the same language as the IP phone API. The exemplary description using HTML is not to be considered as a limitation.

In the HTML example, the HTML API enables an external HTML application to be notified of button presses (or soft key presses) on the IP phone. The external application can use the IP phone's display 108 and buttons 116 in the same manner as a personal computer based web application uses the computer's display and keyboard. An external application, such as the web application module 118 can be used to provide a number of capabilities to the IP phone to enable a user to view a telephone contact's calendar information and place a telephone call to conference with the contact at a mutually available time. The capabilities will be described more fully below.

A selected contact's information, such as phone numbers, can be input by a user into the central data repository 126 in the application server 124 using a computer 132. The computer may be a standard desktop computer, or a portable computing device such as a laptop or hand held computing device. The user can use a typical calendaring or organizational program such as Microsoft Outlook. Once the data has been entered, the graphical user interface 112 shown on the display screen 108 of the IP phone 104 is configured to enable the user to search for a selected contact and the contact's associated phone numbers using the GUI on the IP phone. The IP phone can communicate with the web application module 118 in the web server 120 through the IP phone's API. The web application module can interact with the web service calendar module 122 operating on the web server. The web service calendar module can extract information from the central data repository 126 stored in the application server 124. This information can then be formatted through the web application module and displayed in the graphical user interface 112 of the IP phone. The user is then able to dial one of the phone numbers displayed by the GUI with a single button press or soft key press on the IP phone.

Once a contact is selected, the user can be presented with the option of displaying that contact's availability on their IP phone 104 based display 108. The contact's availability is based on information the contact entered into the contact's calendaring program using a computer 132. This information is then stored in the central data repository 126 in the application server 124, which can be accessed by the IP phone through the web server 120 as described above. In one embodiment, the contact's calendar information may be shown automatically by default when the contact's information is displayed in the GUI 112.

If the selected telephone contact's calendar information is not available to the central data repository, then the web application module will send a message for display in the GUI of the IP phone noting that the calendar information for that contact is not available. This may occur if the contact is not located within the same network as the user. However, it may be possible for the central data repository to obtain the contact's calendar information even if the contact is not within the same network as the user.

The selected telephone contact's IP phone may also be connected through the network 130 to the web server 120, enabling the contact's IP phone to communicate with the web application module 118 and the web service calendar module 122. If the contact is currently unavailable, the user can be presented with the option of being able to place a calendar call back for a selected phone number for the contact. The user can select a first mutually available time. Alternatively, the user may select another time block that is displayed based on the contact's calendar information that is shown on the user's IP phone 104 display 108. The user may also enter a time offset value for the call back time. For instance, if the calendar display on the IP phone shows that the contact is available for a block of time from 10:00 AM to 11:00 AM, the user can set a calendar call back at 10:05 AM to allow the contact time to get back to his or her work location.

If a calendar call back is set, the user's phone can display a message to the user asking the user if they would like to call the contact at that time. In addition to the visual prompt, the IP phone may emit a tone to remind the user of the call. Upon receiving the visual or audio reminder, the user can use the IP phone's GUI 112 to instruct the IP phone to place a phone call to the selected telephone contact. The web application module 118 can automatically place the call via the user's phone to the phone number selected when the callback was set. If there is no action taken by the user in response to the callback message notification, then the web application module can be configured to stop generating the audio and/or visual reminder within a set time.

In another embodiment, if a user selects a telephone contact's information using the IP phone's 104 GUI 112 and the user determines that the contact is not currently available based on the calendar information displayed in the GUI, the user can be presented with the option of being able to place a phone call request for a selected time, such as the first mutually available time indicated in the user's and contact's calendars. An invitation message can then be sent by the web services calendar module 122 to the selected telephone contact's calendar. The invitation message can be displayed on the contact's IP phone 104. The invitation message can indicate that the user would like to have a phone call with the contact at the time selected by the user. If the contact indicates, using the GUI on his or her IP phone, that he or she agrees to the call, their phone may automatically call the user. Alternatively, the phone may emit an unobtrusive tone or sound and display a message to remind the contact to call the user at the selected time. For example, a tone may be emitted and a reminder displayed for 5 minutes around the time selected for the phone call.

The contact can also be presented with the option to decline the call, which would result in a message being displayed on the user's phone indicating that the contact has declined their phone call request. The contact can also have the option to ignore the phone call request. Selecting the ignore option on the GUI can result in clearing the reminder message from the GUI. If there is no action taken by the contact in response to the initial phone call request message within a certain period of time, such as 15 minutes, then the message will stop being displayed. Optionally, a declined message from a contact to the user may be displayed until the user clears the message.

In one embodiment, the messages and reminders sent to the IP phone can also be displayed on the relevant contact's and/or user's calendaring application located on their personal computer or other computing device. This can increase the chances of the user and contact viewing the reminders after they have returned to their work location where their IP phone is located.

In another embodiment, a user can select more than one telephone contact for a proposed conference call. When more than one telephone contact is selected, the web service calendar module 122 can retrieve the calendar information for each selected telephone contact and the web application module 118 can determine a mutually available time when each of the telephone contacts are available and display the available times in the GUI 112 shown on the user's IP phone 104, thereby enabling the user to place or schedule a conference call without the need to contact each party in the conference call in advance to determine a mutually available time.

In order for the user to be able to access the selected telephone contact's information within their computer based calendaring application, the user may need to log in to the central data repository using the same network account credentials that are used by the user to log in to his or her computing device or calendaring application. The user can be presented with a login screen on their IP phone the first time they launch the calendar display application. The user can enter their login and password using soft keys or physical buttons on the phone, such as the user's numeric keypad.

Figure 2:
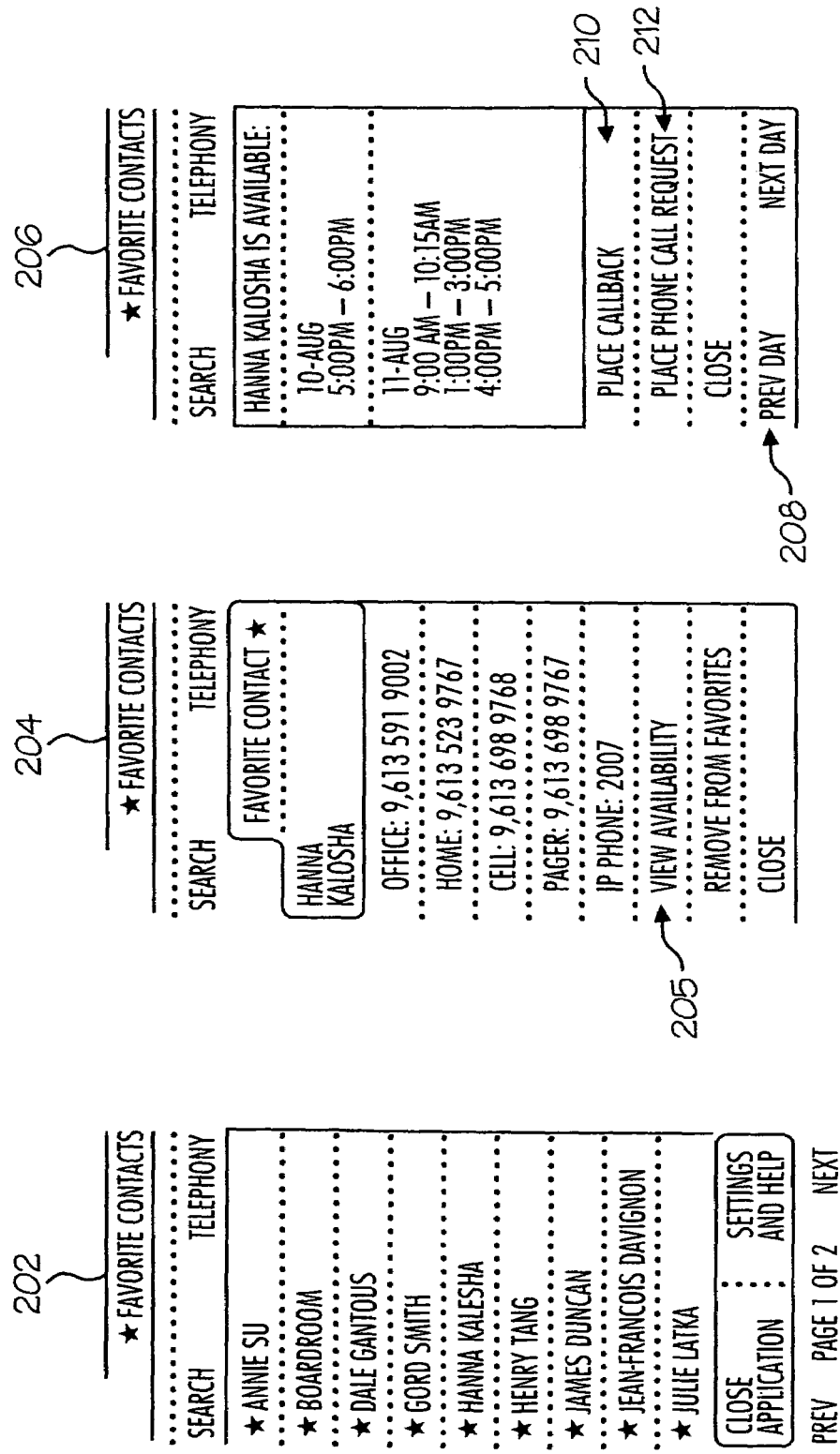
FIG. 2 illustrates exemplary graphical user interfaces used to display the telephone contact's availability on the IP phone in accordance with an embodiment of the present invention.

FIG. 2 illustrates three exemplary graphical user interface screens that may be used for displaying a telephone contact's availability on an IP phone. As previously discussed, the graphical user interfaces may be accessed using adjacent buttons 116, as shown in FIG. 1. Alternatively, the display 108 may be a touch screen, accessible using a finger or stylus. In the example shown in FIG. 2, a user may select a favorite contacts screen 202 showing the user's contacts list. The contacts available on the list may be the same contacts that are available in the user's calendaring application on the user's computer.

To view the contact's information, the user can select a desired contact from the list 202 using an adjacent button on the IP phone or by touching the screen. In the example shown in FIG. 2, the contact Hanna Kalosha is selected. Alternatively, the user can search for a contact by entering characters using the phone dial pad or other available buttons or soft buttons. This action can enable the user to enter characters that can match a contact's name or business that is stored in the user's calendaring and/or contact program. Once the desired contact is selected, the phone displays a selected contact information screen 204 showing a list of phone numbers and other information for the selected contact.

The user can view the selected contact's availability by activating the "view availability" 205 portion of the GUI in the selected contact's information screen 204 using an adjacent button or pressing the screen. This action can send a message through the web application module 118 to the web service calendar module 122 to obtain information for the selected contact from the central data repository 126 in the application server 124, as shown in FIG. 1.

The result of the information obtained from the application server is the ability to show on the IP phone the selected contact's availability screen 206 showing available time slots that the contact expects to be at his or her work location. The available time slots are based on the information the selected contact entered into his or her calendaring application using a computing device such as a desktop or hand held computer. The availability may be represented using text, as shown in FIG. 2. Alternatively, a graphical representation of the contact's availability may be presented in the GUI.

The user may also view the selected contact's available timeslots on additional days by selecting a next day or previous day area 208 of the GUI. Additional GUI interface regions can also be shown, depending on whether the contact was currently busy when the user views the screen, and whether the contact was connected to the same network and using the same application on a connected phone system. For example, if the user and the contact were on the same IP phone system and running the same application and the contact was currently unavailable, the contact's availability screen 206 on the user's phone can display both a "Place Callback" 210 and "Place Phone Call Request" 212 menu item to the user. If the user and the contact were not on the same phone system or one of their IP phones was not running the application, then neither of these menu items may be displayed.

Figure 3:
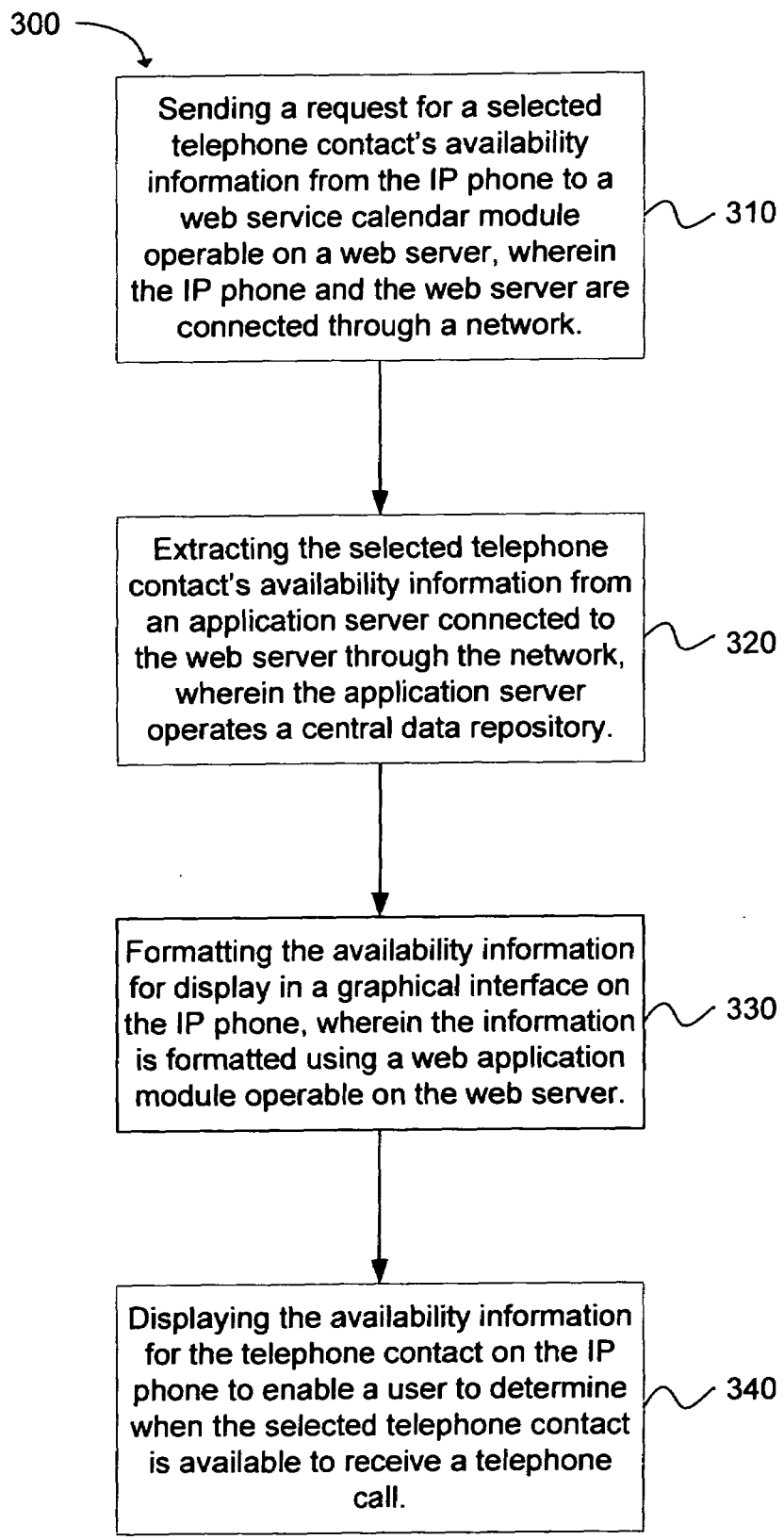
FIG. 3 illustrates a flow chart depicting a method for displaying a telephone contact's availability on an IP phone in accordance with an embodiment of the present invention.

In another embodiment, a method 300 for displaying a contact's availability information on a display of a voice over internet protocol (IP) phone is disclosed, as illustrated in the flow chart of FIG. 3. The method includes the operation of sending 310 a request for a selected telephone contact's availability information from the IP phone to a web service calendar module operable on a web server. The selected telephone contact's availability information can be extracted 320 from an application server connected to the web server through the network. The information can be extracted from a central data repository located on the application server.

The method 300 includes the additional operation of formatting 330 the availability information for display in a graphical interface on the IP phone. The information is formatted using a web application module operable on the web server. The availability information for the selected telephone contact can then be sent to the IP phone through the network and displayed 340 on a display screen of the IP phone to enable a user to determine when the selected telephone contact is available to receive a telephone call.

The ability to display a selected telephone contact's availability on a user's IP phone display enables the user to quickly determine a mutually available time at which to place a phone call. Determining the telephone contact's availability by accessing the contact's calendaring information provides accurate, up to date availability information. Direct voice communication is typically a more effective means of communicating than written communications. However, the difficulty of contacting people during their busy work schedule can make voice communication challenging. The present invention enables voice communication to be accomplished in a more convenient manner and reduce the inherent challenges in reaching business associates and others by phone. The ability to efficiently contact business associates using a telephone can result in significantly increased efficiencies in decision making, business deals, and other work related activities.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A system for displaying a telephone contact's availability, comprising:
   a voice over internet protocol (IP) phone having a display screen;
   a web server in communication with the IP phone and with an application server having a central data repository for a contact and calendar application;
   a web service calendar module operable on the web server and configured to extract contact and calendar information from the central data repository for the telephone contact, said calendar information comprising at least one of the telephone contact available time and busy time;
   a web application module operable on the web server and configured to format the contact and calendar information for display on the IP phone display screen to enable a user to determine the telephone contact's availability based on the contact's calendar information;
   wherein the application server is coupled to a computing device to enable the telephone contact to enter his or her calendar information using the computing device.

2. A system as in claim 1, wherein the application server is selected from the group consisting of a Microsoft Exchange server, a Linux mail server, and an Apple mail server.

3. A system as in claim 1, wherein the web server is selected from the group consisting of an Apache web server, a Microsoft IIS server, and a Google Web server.

4. A system as in claim 1, wherein the application server, the web server, and the IP phone are connected over at least one of a local area network, a wide area network, and an Internet connection.

5. A system as in claim 1, further comprising an application programming interface operable on the IP phone and configured to enable external applications to be displayed on the IP phone's display screen.

6. A method for displaying a contact's availability information on a display of a voice over internet protocol (IP) phone, comprising:
   storing the contact's availability information into a central data repository;
   sending a request for a selected telephone contact's availability information from the IP phone to a web service calendar module operable on a web server, wherein the IP phone and the web server are connected through a network;
   extracting the selected telephone contact's availability information from an application server connected to the web server through the network, wherein the application server operates the central data repository;
   formatting the availability information for display in a graphical interface on the IP phone, wherein the information is formatted using a web application module operable on the web server; and
   displaying the availability information for the telephone contact on the IP phone to enable a user to determine when the selected telephone contact is available to receive a telephone call and wherein displaying the availability information further comprises displaying at least one of the telephone contact's available time and busy time;
   wherein the application server is coupled to a computing device to enable the contact to enter the availability information using the computing device.

7. A method as in claim 6, wherein sending the request further comprises sending the request for the selected telephone contact's availability through the IP phone's application programming interface.

8. A method as in claim 6, wherein extracting the contact's availability information from an application server further comprises extracting the user's availability information from a messaging server using the web service calendar module, wherein the application server is selected from the group consisting of a Microsoft Exchange server, a Linux mail server, and an Apple mail server.

9. A method as in claim 6, further comprising entering the contact's availability information using the computer operating a calendaring application compatible with the central data repository.

10. A method as in claim 6, further comprising sending the formatted availability information to the IP phone for display through the IP phone's application programming interface.

11. A method as in claim 6, further comprising selecting a calendar callback on the IP phone when the selected telephone contact is currently busy.

12. A method as in claim 6, further comprising selecting a selected available time slot based on the telephone contact's availability information displayed on the IP phone, wherein at least one of a visual and an auditory reminder are provided to enable the user to call the telephone contact at the first available time.

13. A method as in claim 6, further comprising displaying a notice on the selected telephone contact's IP phone display when a user has selected a phone call request at an available time slot of the telephone contact based on the telephone contacts availability information displayed on the user's IP phone to enable the selected telephone contact to know that the user will call at the selected time slot.

14. A method as in claim 13, further comprising displaying the notice on the selected telephone contact's calendaring application on the selected telephone contact's computer.

15. A method as in claim 13, further comprising providing the selected telephone contact with an option to reject the user's phone call request and ignore the phone call request.

16. A method for displaying multiple contacts availability information on a display of a voice over internet protocol (IP) phone, comprising:
   storing the multiple contacts availability information into a central data repository;
   selecting at least two telephone contacts using a graphical user interface on the IP phone;
   sending a request for the at least two telephone contact's availability information from the IP phone to a web service calendar module;
   extracting the at least two telephone contact's availability information from the central data repository in an application server in communication with the web service calendar module;
   determining a mutually available time for the at least two telephone contacts based on the contacts availability information;
   formatting the availability information for display in a graphical interface on the IP phone; and
   displaying the availability information for the at least two telephone contacts on the IP phone to enable a user to determine when the at least two telephone contacts are available to receive a telephone call, and wherein displaying the availability information further comprises displaying at least one of the at least two telephone contact's available time and busy time;

wherein the application server is coupled to one or more computing devices to enable the multiple contacts to enter the availability information using one or more computing devices.

17. A method as in claim 16, further comprising displaying a notice on each of the selected telephone contacts IP phone display when a user has selected a phone call request at a mutually available time slot of the telephone contacts based on the telephone contacts availability information displayed on the user's IP phone to enable the selected telephone contacts to know that the user will call at the selected time slot.

* * * * *